United States Patent [19]

Plumer

[11] Patent Number: 5,056,870
[45] Date of Patent: * Oct. 15, 1991

[54] WHEEL NUT ASSEMBLY

[76] Inventor: Mark J. Plumer, 10660 Wilshire Blvd. Apt. 1106, Los Angeles, Calif. 90024

[*] Notice: The portion of the term of this patent subsequent to Feb. 6, 2007 has been disclaimed.

[21] Appl. No.: 472,823

[22] Filed: Jan. 31, 1990

Related U.S. Application Data

[63] Continuation of Ser. No. 222,668, Jul. 25, 1988, Pat. No. 4,898,429.

[51] Int. Cl.$^5$ .............................................. B60B 3/16
[52] U.S. Cl. .................................... 301/9 DN; 301/65
[58] Field of Search ................ 301/9 DN, 65, 63 PN, 301/9 AN, 5 R; 411/368, 369, 432, 533, 534

[56] References Cited

U.S. PATENT DOCUMENTS

| | | | |
|---|---|---|---|
| 3,329,468 | 7/1967 | Beith | 301/9 DN |
| 3,811,737 | 5/1974 | Lejeune | 301/63 PN |
| 3,988,038 | 10/1976 | Hedlund | 301/9 DN |
| 4,679,860 | 2/1987 | Koishi et al. | 301/9 DN |
| 4,898,429 | 2/1990 | Plumer | 301/9 DN |

FOREIGN PATENT DOCUMENTS

| | | | |
|---|---|---|---|
| 2026332 | 10/1970 | Fed. Rep. of Germany | 301/9 DN |
| 0197401 | 10/1985 | Japan | 301/9 DN |

Primary Examiner—Russell D. Stormer
Attorney, Agent, or Firm—Robert J. Schaap

[57] ABSTRACT

A wheel nut asssembly for mounting a non-ferrous wheel, such as a magnesium or aluminum wheel to a wheel hub. The wheel typically has a plurality of openings to receive nut assemblies and each opening has a first section with a first diameter distil to the hub and a second section with a reduced diameter proximate to the hub along with a tapered section extending therebetween. The nut assembly comprises a body section having a plurality of peripherally extending tool engaging walls and with a bore extending through the body section. A skirt is located on the nut body and extends axially with the bore outwardly from the tool engaging walls. An insert formed of a ferrous material is used with the nut and is adapted to extend around the skirt and a portion of the body. The insert has a central opening sized to receive the skirt and an outer wall of the insert is adapted to engage an opening in the wheel. In accordance with this construction, the wheel nut can be tightened about a mounting bore extending from the hub without the risk of crushing or bending the non-ferrous wheel.

12 Claims, 1 Drawing Sheet

U.S. Patent    Oct. 15, 1991    5,056,870
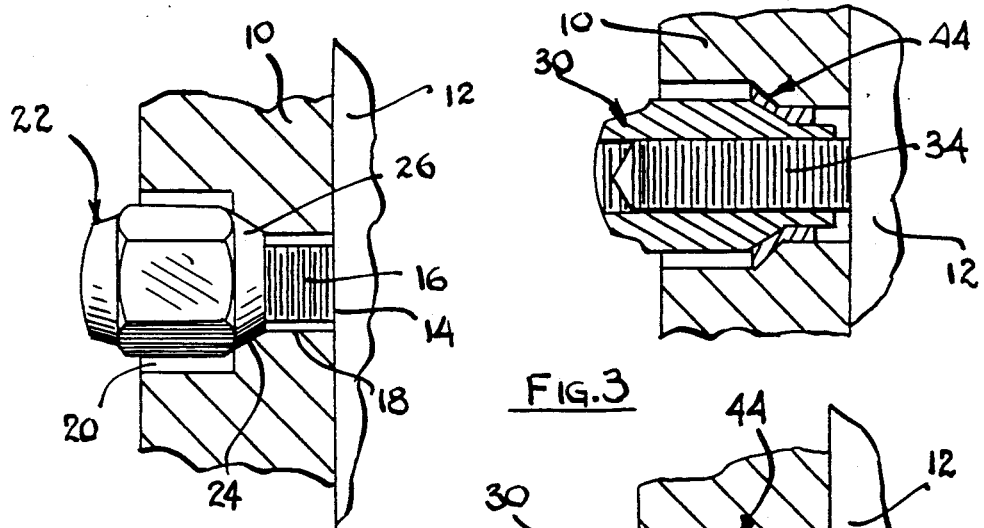
FIG.1 PRIOR ART
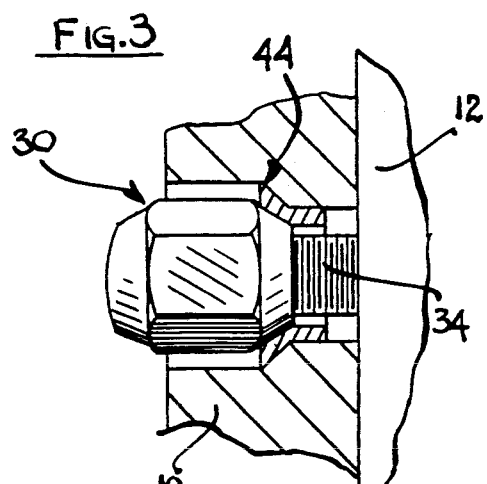
FIG.3
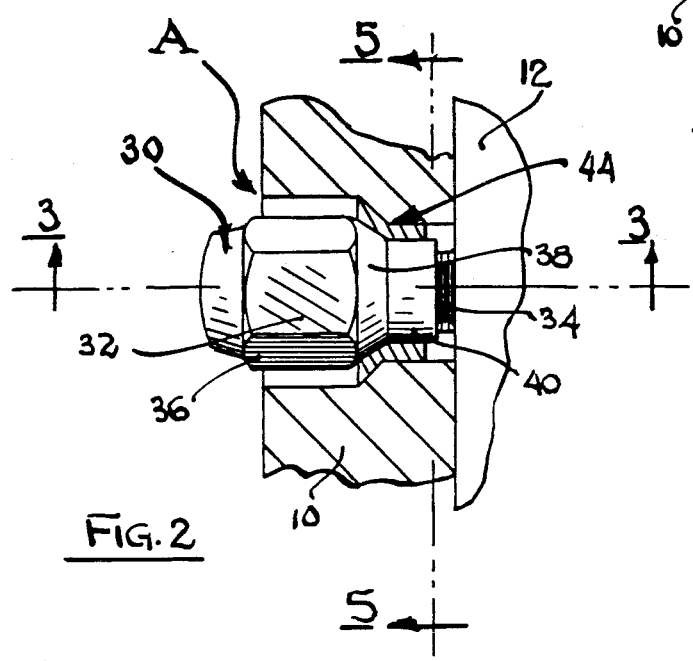
FIG.2
FIG.6
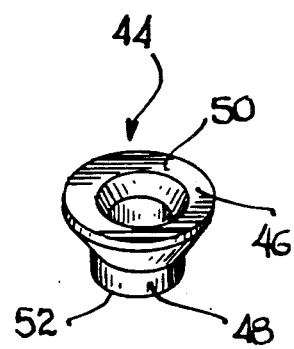
FIG.4
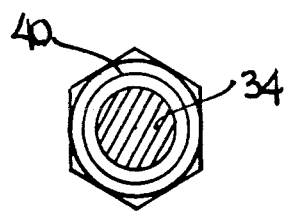
FIG.5

WHEEL NUT ASSEMBLY

This application is a continuation of Ser. No. 222,668 filed July 25, 1988, now U.S. Pat. No. 4,898,429.

BACKGROUND OF THE INVENTION

1. Field of the Invention

This invention relates in general to certain new and useful improvements in wheel nut assemblies and means and method for mounting a non-ferrous wheel to a hub of a vehicle, and more particularly, to a wheel nut assembly and a means and method for mounting a non-ferrous wheel to a hub which utilizes a nut with a skirt and an insert extending between an opening in the wheel and surrounding the body of the nut and the skirt thereon.

2. Brief Description of the Prior Art

In recent years, automobile manufacturers have resorted to the production of non-ferrous wheels for motor vehicles and particularly, wheels made of aluminum and magnesium. In addition, wheels which are made of non-ferrous materials are frequently offered in the automotive aftermarket or so-called "secondary market" for purposes of customizing a vehicle. As a result of their light weight, non-ferrous wheels have been used frequently in racing vehicles and have thereby become popularized. Accordingly, many automotive enthusiasts will therefore substitute these non-ferrous wheels for the conventionally provided steel vehicle wheel.

Several problems have been encountered when attempting to mount a non-ferrous wheel to the hub of a vehicle. Generally, the hub is formed of steel and the lug nuts used to secure the wheel to the hub are also formed of steel. When using the conventional lug nut, portions of the wheel surrounding the bolt holes, which receive the bolt stem or so-called "stud" extending from the hub, are effectively compressed between the lug nut and the hub. Inasmuch as the nut and the hub are formed of a much harder material than the non-ferrous wheel, they effectively bend and crush portions of the softer non-ferrous metal wheel. Accordingly, the user of the non-ferrous wheel had to exercise special care when tightening the lug nut onto the bolt stem extending from the hub in order to preclude damage to the wheel. Moreover, this concern causes the user to exercise caution and the user often fails to tighten the lug nuts with the requisite amount of torque to obtain a safe mounting of the wheel.

In addition to the above, in order to tighten the lug nut against the wheel with the requisite amount of force, the aluminum wheel had to have sufficient thickness in the region of the bolt receiving holes in order to accommodate the compressive force which is imposed on the wheel. If there was not a sufficient thickness of metal forming the wheel and surrounding the hole, then the wheel could be easily crushed or bent. However, generally all hub studs are of a standard length. Moreover, that length is established for the mounting of a steel wheel onto the hub using steel lug nuts. As a result, when there is an increased thickness in the wheel in the region surrounding the holes which receive the hub stems, there is less threaded length of the stud available for engagement by the lug nut. As a simple example, where the conventional stud is $\frac{3}{4}$ inches long, if the wheel was made with a thickness of $\frac{1}{2}$ inch, in the region of the holes receiving the studs, then there would only be about $\frac{1}{4}$ inch or less remaining for securement of the lug nut.

This problem of insufficient tightening length of the wheel stud available for a lug nut has created several problems. First of all, there is not sufficient gripping length of the stud available in order to obtain effective tightening action of the wheel lug nut with the required amount of force. Moreover, due to the fact that the lug nut is not securely tightened onto the hub stud, there is a tendency for the wheel nut to vibrate and become loosened from its position on the threaded stud. This condition creates the obvious danger of the wheel becoming loosened from the wheel hub during movement of the vehicle.

OBJECTS OF THE INVENTION

It is, therefore, one of the primary objects of the present invention to provide a lug nut assembly which enables the mounting of a non-ferrous wheel to the hub of a vehicle and which utilizes a skirted lug nut and an insert adapted for surrounding disposition about the skirted nut.

It is another object of the present invention to provide a lug nut assembly of the type stated which permits tightening of the wheel against the hub without any substantial risk of damaging the wheel.

It is a further object of the present invention to provide a lug nut assembly which enables the tightening of the wheel onto the hub of a vehicle with the desired amount of force in order to obtain a positive and secure mounting of a non-ferrous wheel onto the vehicle hub.

It is an additional object of the present invention to provide a lug nut assembly of the type stated which can be used with a wide variety of vehicles produced by various manufacturers thereof.

It is another salient object of the present invention to provide a lug nut assembly of the type stated which is highly effective in use and which can be manufactured at a relatively low cost.

With the above and other objects in view, my invention resides in the novel features of form, construction, arrangement and combination of parts presently described and pointed out in the claims.

BRIEF SUMMARY OF THE INVENTION

A wheel nut assembly for mounting of a non-ferrous wheel to a wheel hub and which hub is typically formed of a steel material. The assembly comprises a lug nut having a body section with a plurality of peripherally extending tool engaging walls. This body section also has a central bore extending therethrough. The tool engaging walls are preferably flat surfaces, such as hexagonally arranged surfaces adapted to be received by the socket of a wrench.

A skirt is located on the nut and extends axially with the bore outwardly from the tool engaging walls. The skirt is preferably integrally formed with the body of the nut itself. Moreover, the skirt also has a cental bore in alignment with the central bore of the body and is sized to receive a stud extending outwardly from the hub of the vehicle.

The wheel nut assembly of the present invention also comprises an insert formed of a ferrous material and which is adapted to extend around a portion of the skirt. The insert is also provided with a central opening to receive the skirt. The ferrous insert further has an outer wall which is adapted to engage the opening in the wheel. In a more preferred embodiment, the ferrous insert also engages a portion of the body of the lug nut as well as the skirt of the lug nut. The insert is centrally opened and has an interior shape in the central opening to conform to and snuggly engage both the skirt and a portion of the body of the lug nut.

In accordance with the above identified construction, the insert surrounds the lug nut and since it does not have any relatively sharp corners the forces imposed on the insert by the lug nut are distributed throughout the surface of the insert. As a result, the lug nut can be tightened with a substantial amount of force against the insert which, in turn, bears against the softer aluminium wheel. This construction utilizing a skirt on the lug nut and which is surrounded by the insert enables the lug nut to engage a substantial portion of the length of the lug nut. This construction thereby eliminates the tendency of the lug nut to vibrationally unwind on the shank of the stud extending from the wheel hub.

This invention possesses many other advantages and has other purposes which may be made more clearly apparent from a consideration of the forms in which it may be embodied. One of the preferred forms in the invention is more fully described in the following detailed description of the invention. However, it is understood that such detailed description is not to be taken in a limiting sense and is only illustrative of one of the preferred embodiments of the present invention.

BRIEF DESCRIPTION OF THE DRAWINGS

Having thus described the invention in general terms, reference will now be made to the accompanying drawings (two sheets) in which:

FIG. 1 is a side elevational view, partially broken away and in section, and showing a prior art mounting arrangement utilizing a steel nut bearing against an aluminum wheel;

FIG. 2 is a side elevational view, partially broken away and in section, showing a lug nut assembly for mounting an aluminum, wheel to a vehicle hub in accordance with the present invention;

FIG. 3 is a vertical sectional view taken along line 3—3 of FIG. 2;

FIG. 4 is a perspective view showing a portion of an insert used in the lug nut assembly of the present invention;

FIG. 5 is a horizontal sectional view taken along line 4—4 of FIG. 2; and

FIG. 6 is a side elevational view, partially broken away and in section and showing an arrangement where a lug nut assembly does not provide for proper gripping action on the stud of a wheel.

DETAILED DESCRIPTION OF A PREFERRED EMBODIMENT

Referring now in more detail and by reference characters to the drawings which illustrate a preferred embodiment of the present invention, FIG. 1 illustrates a conventional prior art arrangement for mounting an aluminum wheel, or other non-ferrous wheel, 10 to a hub 12 of a vehicle. The hub 12 is generally secured to and extends circumferentially around the axle of the vehicle and is adapted to receive any conventional wheel.

The plurality of threaded studs 14 (usually four to eight threaded studs) are circumferentially spaced about and extend outwardly from a flat surface of the vehicle hub. One of those studs 14 is more fully illustrated in FIG. 1 of the drawings and extends outwardly from a flat surface of the hub 12. Moreover, the hub stud 14 is provided with an externally threaded section 16.

The conventional vehicle wheel, such as the aluminum wheel 10, is provided with a plurality of bolt holes 18, having cylindrically shaped regions; which are sized and arranged to receive the outwardly extending studs on the vehicle hub 14. Moreover, the bolt holes 18 extend into and communicate with large nut receiving recesses 20 formed within the vehicle wheel 10 for receiving conventional lug nuts 22. A frustoconically shaped tapered wall 24 (a conically shaped region) extends between the recess 20 and the bolt hole 18, in the manner as illustrated in FIG. 1 of the drawings, in order to receive and to be engaged by a bearing surface 26 on a conventional lug nut 22.

In accordance with the above identified construction, a non-ferrous vehicle wheel may be mounted to the hub 12 of the vehicle by locating the various studs 14 in the bolt holes 18 of the wheel. Thereafter, the wheel is secured to the hub of the vehicle by tightening the lug nuts 22 on the externally threaded section 16 of each of the studs 14. In accordance with this prior art arrangement, the bearing surfaces 26 of the lug nuts will engage and bear against the frustoconical outwardly flaring surface 24 of the non-ferrous wheel 10.

As indicated previously, most conventional vehicles are constructed so as to receive steel wheels. When a steel wheel is mounted to the studs extending outwardly from the hub there is generally no problem in providing a security fit and tight locking arrangement of the wheel on the vehicle hub. However, and as indicated previously, several problems do arise when attempting to mount a non-ferrous wheel to a vehicle hub.

Due to the fact that an aluminum or magnesium wheel is much softer than a steel wheel, and also due to the fact that it does not have the same inherent strength and rigidity, the aluminum wheel and the magnesium wheel often have thicker wall constructions in order to compensate for the lack of strength requirements which are inherent in the steel wheel. As a result, the lug nuts 22 are not capable of being tightened around the greater portion of the threaded section 16 of the length of the stud 14. FIG. 1 illustrates a problem which arises when a wheel of thicker sidewall than a steel wheel is mounted on a vehicle hub. It can be observed that the conventional lug nut engages the outwardly flaring frustoconical surface 24 at an appreciable distance from the face of the hub 12. Accordingly, only a few threads of the stud 14 are engaged by the lug nut 22.

As a result of the fact that there is not a tight securement of the lug nut on the stud, vibrational forces which inevitably arise during movement of the vehicle will cause the lug nut 22 to unwind on the shank of the stud 14. Furthermore, the unsupported length of the stud allows the stud to flex during rotation of the wheel and this, in turn, cause the nut to dig into the soft aluminum face and become loosened from the stud.

FIGS. 2 through 5 illustrate a lug nut assembly A used for securing an aluminum wheel or other non-ferrous wheel 10 to the studs 14 extending outwardly from the vehicle hub 12. The lug nut assembly A of the present invention generally comprises a lug nut 30 having a central body section 32 with an internally threaded cylindrical bore 34 extending therethrough. The body section 32 is provided with a plurality of tool engaging circumferentially arranged relatively flat surfaces 36 often referred to as tool engaging walls, which are located to receive the socket or flats of a conventional wrench.

At its inner end, that is the end facing the hub 12 of the vehicle, reference being made to FIG. 2, the body section 32 integrally merges into a tapered bearing face 38 which is sized to normally engage and bear against the frustoconical wall 24 in the conventional aluminum wheel or magnesium wheel. The tapered bearing wall 38 also integrally merges into an inwardly extending cylindrically shaped skirt 40 which is also integral with the body 32 of the lug nut. The skirt 40 is also provided with the internally threaded central bore sized to receive the externally threaded stud 14 on the hub 12 of the vehicle.

The lug nut assembly of the present invention is also provided with a insert 34 which is also formed of a ferrous material such as steel and which is also best illustrated in FIG. 4 of the drawings. It can be observed that the insert 44 comprises a conically shaped section in the form of an inwardly tapering head 46 which integrally merges into a cylindrically shaped section, such as a sleeve 48. The head 46 is provided with a conically shaped opening 50 generally conforming to the exterior shape of the head 46, in the manner as best illustrated in FIGS. 3 and 4 of the drawings. In like manner, the sleeve 48 is provided with a central bore 52 communicating with the opening 50. In this way, it can be sen that the insert has a conically shaped inner wall bearing against the conically shaped section on the body of the nut and a conically shaped outer wall bearing against the conically shaped region of the wheel. In like manner, the insert also has a cylindrically shaped inner wall section bearing against a substantial portion of the axial length of the skirt and also a cylindrically shaped outer wall bearing against the cylindrically shaped region of the wheel.

By further reference to FIG. 2, it can be observed that the insert 44 is adapted to fit snugly about the bearing wall 38 of the lug nut 30 and the skirt 40 of the lug nut. More specifically, it can be observed that the head 46 of the insert engages the bearing surface 38 and the sleeve 48 of the insert 44 snugly engages the skirt 40 on the lug nut. In addition, the exterior face of the head 46 of the insert engages the frustoconical surface 24 formed in the vehicle wheel and the exterior face of the sleeve 48 bears against the cylindrically shaped bore of the bolt hole formed in the vehicle wheel.

In accordance with the construction utilizing the nut lug assembly of the present invention, it can be observed that the lug nut can be tightly engaged against the steel insert 44. Moreover, the insert 44 generally conforms to and will bear against the surface of the aluminum or magnesium wheel surrounding the bolt hole. Inasmuch as the insert generally conforms to the surface of the material surrounding the bolt hole, there is a generally even distribution of forces. As a result, the insert does not bite into or otherwise distort the softer aluminum or magnesium wall. Furthermore, the skirt on the lug nut bears against the cylindrically shaped sleeve on the insert and in this way, the sleeve on the insert is captured between the skirt of the lug nut and the bore of the bolt hole formed in the wheel.

FIG. 6 illustrates the very undesirable situation which could arise if the insert were used with a lug nut which did not have a skirted portion thereon. In FIG. 6, it can be observed that while the steel cylindrically shaped sleeve bears against the surface of the material surrounding the bolt hole, there is no skirt portion or other material which provides rigidity to the vehicle stud. Accordingly, there is insufficient gripping of the lug nut on the vehicle stud.

Thus it has been established that a lug nut must engage at least a length of stud equivalent to at least one times the thread diameter for at least a minimum desired threaded engagement. The prior art lug nut arrangements used for mounting the aluminum and magnesium wheels did not afford this protection. However, the lug nut assembly of the present invention is more than adequate in meeting this minimum requirement. The lug nut arrangement of the present invention has been installed and tested on over 300,000 wheels and there has not been any one reported failure of a lug nut loosening or any other type of failure.

Thus, there has been illustrated and described a unique and novel lug nut assemby for securing a non-ferrous wheel to a hub of a vehicle and which utilizes a skirted lug nut and a ferrous insert therefore. Thus, the present invention fulfills all of the objects and advantages which have been sought therefore. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention which is limited only by the following claims.

Having thus described the invention, what I desire to claim and secure by letters patent, is:

1. An improvement for use in the mounting of a non-ferrous wheel to a wheel hub having a hardness substantially greater than that of the wheel and where a plurality of threaded studs extend outwardly from the hub into and through respective ones of a plurality of openings in the wheel and where lug nuts are used to secure the wheel to the hub, the openings in the wheel each having a conically shaped region which diverges outwardly at a side of the wheel distal to the hub and a connected cylindrically shaped region, and each of the lug nuts being characterized in that they each comprise a body with an internally threaded bore for threaded engagement with the threaded studs, an outwardly extending conically shaped section on said body of each lug nut, each said conically shaped section having an end proximate said body and an end distal to said body and a tapered outer wall which converges towards a reduced diameter at the end distal to said body, the conically shaped section on each of said bodies extending outwardly from each said body toward one of the openings in said wheel and said conically shaped section also having a central bore sized to receive a threaded stud; the improvement comprising an insert for use with each of said lug nuts and which inserts are formed of a material of hardness similar to that of the hub and substantially greater than that of the wheel, each said insert comprising a body having a cylindrically shaped shank and an integral outwardly flaring conically shaped head with a central bore extending therethrough and which insert is adapted to extend about a portion of the conically shaped section on the body of the lug nut when in use, said head of each said insert having a conically shaped inner wall in said bore sized to bear against the conically shaped region on said body of a nut and a conically shaped outer wall sized to bear against the conically shaped region of said wheel, said insert also having the cylindrically shaped shank integral with the conically shaped section of the insert and having a cylindrically shaped exterior wall sized to bear against the cylindrically shaped region of the wheel such that the outer surface of the insert generally conforms to the shape of the opening in the wheel thereby enabling a generally even distribution of clamping forces from the nut, whereby a substantial length of the studs can be gripped by the nut and with the insert of a harder material than said wheel bearing against the openings in the wheel, so that the nut may be tightened on the stud without crushing or bending the wheel and so that the nut can grip a sufficient length of a stud to preclude a vibrational unwinding from the stud.

2. The improvement of claim 1 further characterized in that said insert is formed of a ferrous material.

3. The improvement of claim 1 further characterized in that the lug nut has a plurality of peripherally extending tool engaging walls on the body which are parallel to a central axis of the bore, and where the insert does not extend up to or engage such tool engaging walls.

4. The improvement of claim 1 further characterized in that the cylindrically shaped section of the insert has an outer diameter sized to snugly bear against the cylindrically shaped region of a hole in the wheel and an inner diameter sized to snugly receive and bear against a portion on the nut to thereby provide a body bound condition.

5. An improvement for use in the mounting of a non-ferrous wheel to a wheel hub where a plurality of threaded studs extend outwardly from the hub into and through respective ones of a plurality of openings in the wheel and where lug nuts are used to secure the wheel to the hub, the openings in the wheel each having a conically shaped region which diverges outwardly at a side of the wheel distal to the hub and a connected cylindrically shaped region, and each of the lug nuts being characterized in that they each comprise a body with an internally threaded bore for threaded engagement with the threaded studs, an outwardly extending conically shaped section on said body of each lug nut, each said conically shaped section having an end proximate said body and an end distal to said body and a tapered outer wall which converges towards a reduced diameter at the end distal to said body, a hollow skirt integral with the conically shaped section on each of said bodies and extending outwardly from each said body toward one of the openings in said wheel and each said skirt also having a central threaded bore sized to receive a threaded stud; the improvement comprising an insert for use with each of said lug nuts and associated skirts and which inserts are formed of a material of greater hardness than that of the wheel, each said insert comprising a body having a cylindrically shaped shank and an integral outwardly flaring conically shaped head with a central bore extending therethrough and which insert extends about a portion of the conically shaped section on the body of the lug nut and a portion of the associated skirt when in use, said head of each said insert having a conically shaped inner wall in said bore bearing against the conically shaped region on said body of a nut and a conically shaped outer wall bearing against the conically shaped region of said wheel, said insert also having the cylindrically shaped shank integral with the conically shaped section of the insert and having a cylindrically shaped interior wall in said bore sized to bear against the skirt on said nut and also having a cylindrically shaped exterior wall bearing against the cylindrically shaped region of the wheel such that the outer surface of the insert generally conforms to the shape of the opening in the wheel thereby enabling a generally even distribution of clamping forces from the nut, whereby a substantial length of the studs can be gripped by the nut and skirt and with the insert of a harder material than said wheel bearing against the openings in the wheel.

6. The improvement of claim 5 further characterized in that said insert is formed of a ferrous material.

7. The improvement of claim 5 further characterized in that the lug nut has a plurality of peripherally extending tool engaging walls on the body which are parallel to a central axis of the bore, and where the insert does not extend up to or engage such tool engaging walls.

8. The improvement of claim 5 further characterized in that the cylindrically shaped section of the insert has an outer diameter sized to snugly bear against the cylindrically shaped region of a hole in the wheel and an inner diameter sized to snugly receive and bear against a portion on the nut to thereby provide a body bound condition.

9. A non-ferrous wheel arrangement for securement of a wheel to a wheel hub of a vehicle on a plurality of outwardly extending studs which extend through holes in the wheel and where the wheel hub has a hardness substantially greater than the wheel, said wheel arrangement comprising:

a vehicle wheel formed of a non-ferrous material and having a plurality of holes extending through the wheel for receiving outwardly extending studs on a vehicle hub, each of said holes having a conically shaped region and a connected cylindrically shaped region with the cylindrically shaped region being on the side of the wheel facing the hub when the wheel is mounted on the hub, an insert formed of a ferrous material having a hardness similar to that of said hub and substantially greater than said wheel, said insert having a centrally opening sized and shaped to receive a conically shaped section on a body of a lug nut and a skirt on the lug nut, said insert also having a conically shaped inner wall adapted to bear against the conically shaped section on the body of a lug nut and a conically shaped outer wall sized to bear against the conically shaped region of said wheel, said insert further having a cylindrically shaped section integral with the conically shaped section of the insert sized to receive a skirt on a nut and extending along and to bear against a substantial portion of the axial length of the skirt on the nut, the cylindrically shaped section of said insert also bearing against the cylindrically shaped region of said wheel, such that the outer surface of the insert generally conforms to the shape of the opening in the wheel thereby enabling a generally even distribution of clamping forces from the nut, so that a lug nut may be tightened on the wheel studs without crushing the wheel or damaging the studs and so that a lug nut can grip a sufficient length of stud to preclude a vibrational unwinding from the stud and reducing flexing of the stud and damaging of the stud receiving holes in the wheel.

10. The wheel arrangement of claim 9 further characterized in that the nut which can be used therewith comprises:

a) a body with a plurality of peripherally extending tool engaging walls and with a bore extending therethrough,
b) a conically shaped section on said body, said conically shaped section having an end proximate said body and an end distal to said body and a tapered outer wall which converges towards a reduced diameter at the end distal to said body, and
c) a skirt connected to the distal end of said conically shaped section and extending outwardly from said tool engaging walls axially with said bore, said skirt and conically shaped section having a bore communicating with the bore of the body and being sized to receive a mounting stud extending from said wheel hub.

11. The wheel nut assembly of claim 9 further characterized in that said cylindrically shaped section of said insert has a cylindrically shaped interior wall which also extends around and bears against a portion of the skirt on the body of the nut when in use.

12. The wheel nut assembly of claim 11 further characterized in that the conically shaped outer wall of said insert has the same angle of taper as a conically shaped region of the wheel to engage and be received by the opening in said wheel.

* * * * *